(12) United States Patent
Hidaka et al.

(10) Patent No.: US 12,339,223 B2
(45) Date of Patent: Jun. 24, 2025

(54) MEASURING APPARATUS AND TESTING APPARATUS HAVING THE SAME

(71) Applicant: Samsung Electronics Co., Ltd., Suwon-si (KR)

(72) Inventors: Yasuhiro Hidaka, Yokohama (JP); Ingi Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 205 days.

(21) Appl. No.: 18/334,789

(22) Filed: Jun. 14, 2023

(65) Prior Publication Data

US 2024/0183777 A1    Jun. 6, 2024

(30) Foreign Application Priority Data

Dec. 6, 2022 (JP) ................................ 2022-194644
Feb. 3, 2023 (KR) ........................ 10-2023-0014690

(51) Int. Cl.
*G01N 21/3581* (2014.01)

(52) U.S. Cl.
CPC ............. *G01N 21/3581* (2013.01); *G01N 2201/06113* (2013.01)

(58) Field of Classification Search
CPC .................... G01N 21/3581; G01N 21/956
See application file for complete search history.

(56) References Cited

U.S. PATENT DOCUMENTS

| 5,420,595 | A | 5/1995 | Zhang et al. |
| 9,234,934 | B2 * | 1/2016 | Nakanishi ............ G01N 21/956 |
| 10,680,124 | B2 | 6/2020 | Darcie et al. |
| 11,204,319 | B2 | 12/2021 | Dholakia |

(Continued)

FOREIGN PATENT DOCUMENTS

| CA | 2404434 A1 * | 10/2001 |
| JP | 2000-074954 A | 3/2000 |

(Continued)

OTHER PUBLICATIONS

Yongfang, "Research on terahertz photoconductive antenna and its array", 2020 (Year: 2020).*

(Continued)

*Primary Examiner* — Maurice C Smith
(74) *Attorney, Agent, or Firm* — Harness, Dickey & Pierce, P.L.C.

(57) ABSTRACT

A measuring apparatus includes a first beam splitter, a diffraction grating, an optical illumination system, an optical condensing system configured to condense an electromagnetic wave EH radiated from the specimen, a time domain detector configured to detect the electromagnetic wave EH, for each time when the trigger beam, light path length of which has been changed in a delay mechanism, is incident, and a controller configured to lock-in detect the electromagnetic wave EH with a driving frequency of an amplitude modulation element, wherein the controller obtains a magnitude and a direction of an electric field of the measurement portion by Fourier transforming a time domain waveform of the detected electromagnetic wave EH to obtain a frequency domain waveform, and filtering a frequency band from the obtained frequency domain waveform.

20 Claims, 12 Drawing Sheets

(56) References Cited

U.S. PATENT DOCUMENTS

| | | |
|---|---|---|
| 2004/0246011 A1 | 12/2004 | Tonouchi et al. |
| 2006/0006886 A1 | 1/2006 | Yamashita et al. |
| 2008/0084554 A1* | 4/2008 | Ohtake ............ G01N 21/3581 356/51 |
| 2008/0130093 A1 | 6/2008 | Silberberg et al. |
| 2012/0305774 A1 | 12/2012 | Kiwa et al. |
| 2013/0083319 A1 | 4/2013 | Nakanishi et al. |
| 2014/0217288 A1 | 8/2014 | Kamata |
| 2014/0332687 A1 | 11/2014 | Yamana et al. |
| 2015/0244143 A1 | 8/2015 | Kim et al. |

FOREIGN PATENT DOCUMENTS

| | | | |
|---|---|---|---|
| JP | 2004163284 A | * | 6/2004 |
| JP | 2006-024774 A | | 1/2006 |
| JP | 4001373 B2 | | 10/2007 |
| JP | 2008-170353 A | | 7/2008 |
| JP | 2009-052893 A | | 3/2009 |
| JP | 2013-076618 A | | 4/2013 |
| JP | 5547868 B2 | | 7/2014 |
| JP | 5804362 B2 | | 11/2015 |
| JP | 5822194 B2 | | 11/2015 |
| JP | 6286863 B2 | | 3/2018 |
| JP | 2022-042285 A | | 3/2022 |
| JP | 2022-098192 A | | 7/2022 |

OTHER PUBLICATIONS

Q. Islama, THz emission from semiconductors using excitation by a tilted pulse front, 2020 (Year: 2020).*

Yamashita, et al. "Backside observation of large-scale integrated circuits with multilayered interconnections using laser terahertz emission microscope," Applied Physics Letters, No. 94, pp. 191104-191104-3 (2009).

Yamashita, et al. "Laser THz emission miscroscope as a novel tool for LSI failure analysis," Microelectronics Reliability, No. 49, 1116-1126 (2009).

Oron, et al. "Scanningless depth-resolved microscopy," Optics Express, vol. 13, No. 5, pp. 1468-1476 (2005).

* cited by examiner

MEASURING APPARATUS AND TESTING APPARATUS HAVING THE SAME

CROSS-REFERENCE TO RELATED APPLICATION(S)

This application claims benefit of priority to Japanese Patent Application No. 2022-194644 filed on Dec. 6, 2022, and Korean Patent Application No. 10-2023-0014690 filed on Feb. 3, 2023 in the Korean Intellectual Property Office, the disclosure of each of which is incorporated herein by reference in its entirety.

BACKGROUND

The present inventive concept relates to measuring apparatuses and/or testing apparatuses having the same.

SUMMARY

Some example embodiments of the present inventive concepts provide measuring apparatuses and/or testing apparatuses capable of precisely measuring an electric field inside a specimen.

Some example embodiments of the present inventive concepts provide measuring apparatuses and/or testing apparatuses capable of improving precision in measuring a magnitude and a direction of an electric field.

According to an aspect of the present inventive concepts, a measuring apparatus may include a first beam splitter configured to split a pulsed laser beam into a pump beam and a trigger beam, an amplitude modulation element disposed on a light path of the pump beam, a diffraction grating configured to disperse the pump beam, an optical illumination system configured to illuminate a specimen to condense the dispersed pump beam on a measurement portion of the specimen, an optical condensing system configured to condense an electromagnetic wave radiated from the specimen illuminated by the pump beam, a delay mechanism configured to change a light path length of the trigger beam, a time domain detector configured to detect the electromagnetic wave condensed by the optical condensing system, for each time when the trigger beam, the light path length of which has been changed in the delay mechanism is incident, and a controller configured to lock-in detect the electromagnetic wave detected by the time domain detector with a driving frequency of the amplitude modulation element, wherein the controller is configured to perform a Fourier transform on a time domain waveform of the detected electromagnetic wave to obtain a frequency domain waveform and obtain a magnitude and a direction of an electric field of the measurement portion by filtering a frequency band from the obtained frequency domain waveform.

In an example embodiment, the time domain detector may comprise a photoconductive antenna, the optical illumination system may include a collimator lens on which the pump beam dispersed by the diffraction grating is incident, a second beam splitter configured to split the pump beam and the electromagnetic wave, and an out-of-axial parabolic mirror between the second beam splitter and the specimen, and configured to condense the dispersed pump beam on the measurement portion, the optical condensing system may include the out-of-axial parabolic mirror, the second beam splitter, and a condensing lens configured to condense the electromagnetic wave. The diffraction grating may be configured to disperse the pump beam, and the collimator lens is configured to transmit therethrough the pump beam dispersed by the diffraction grating to be converted into parallel beams. The second beam splitter may be configured to transmit therethrough the pump beam converted into the parallel beams through the collimator lens, and the out-of-axial parabolic mirror is configured to condense the pump beam from the second beam splitter on the measurement portion. The out-of-axial parabolic mirror may be configured to reflect the electromagnetic wave radiated from the specimen to be parallel beams, and the second beam splitter is configured to reflect the electromagnetic wave converted into the parallel beams by the out-of-axial parabolic mirror to be condensed on the photoconductive antenna by the condensing lens.

In an example embodiment, the optical illumination system and the optical condensing system may further include a Galvano-mirror that is between the out-of-axis parabolic mirror and the second beam splitter and configured to cause the pump beam to scan the specimen.

In an example embodiment, the delay mechanism may be configured to change the light path length of the trigger beam by switching optical fibers having different lengths with a light switch.

In an example embodiment, the photoconductive antenna may include a low temperature grown gallium arsenide as a material, the pulsed laser beam may have a wavelength of 800 nm to 1550 nm, and a pulse width of 1 ps or less, and the controller may be configured to use the frequency band from 100 GH or more to 10 THz or less.

In an example embodiment, the specimen may include a silicon wafer during a manufacturing process of a semiconductor apparatus device, and a structure of at least a portion of a semiconductor device may be on a front surface of the silicon wafer.

In an example embodiment, the measuring apparatus may further comprise a second harmonic generator configured to change a wavelength of the trigger beam, wherein the pulsed laser beam may comprise a wavelength of 1000 nm or more, the optical illumination system may be configured to cause the pump beam to be incident on a rear surface of the specimen, and the optical condensing system may be configured to condense the electromagnetic wave emitted from the rear surface of the specimen on the time domain detector.

In an example embodiment, a wavelength of the pulsed laser beam may be 1000 nm or more, and the electromagnetic wave generated from the specimen on which the pump beam is incident may be caused by photocarriers generated by a two-photon absorption of the pump beam.

According to an aspect of the present inventive concepts, a measuring apparatus, may include a first beam splitter configured to split a pulsed laser beam having a wavelength of 1100 nm or more into a pump beam and a trigger beam, an amplitude modulation element on a light path of the pump beam, an optical illumination system configured to illuminate a silicon wafer as a specimen to condense the pump beam on a measurement portion of the silicon wafer, an optical condensing system configured to condense an electromagnetic wave radiated via a two-photon absorption from the silicon wafer illuminated by the pump beam, a delay mechanism configured to change a light path length of the trigger beam, a time domain detector configured to detect the electromagnetic wave condensed by the optical condensing system, for each time when the trigger beam, the light path length of which has been changed in the delay mechanism is incident, and a controller configured to lock-in detect the electromagnetic wave detected by the time domain detector with a driving frequency of the amplitude modulation element, wherein the controller is configured to perform Fourier transform on a time domain waveform of the detected electromagnetic wave to obtain a frequency domain waveform and obtain a magnitude and a direction of an electric field of the measurement portion by filtering a frequency band from the obtained frequency domain waveform.

In an example embodiment, the time domain detector may comprise a photoconductive antenna. The optical illumination system may include a collimator lens, a second beam splitter configured to split the pump beam and the electromagnetic wave, and an out-of-axial parabolic mirror between the second beam splitter and the silicon wafer, and configured to condense the pump beam on the measurement portion. The optical condensing system may include the out-of-axial parabolic mirror, the second beam splitter, and a condensing lens configured to condense the electromagnetic wave. The collimator lens may be configured to transmit therethrough the pump beam to be parallel beams. The second beam splitter may be configured to transmit therethrough the pump beam converted into the parallel beams through the collimator lens, and the out-of-axial parabolic mirror is configured to condense the pump beam from the second beam splitter on the measurement portion. The out-of-axial parabolic mirror may be configured to reflect the electromagnetic wave radiated from the silicon wafer to be parallel beams, and the second beam splitter is configured to reflect the electromagnetic wave converted into the parallel beams the out-of-axial parabolic mirror to be condensed on the photoconductive antenna by the condensing lens.

In an example embodiment, the optical illumination system and the optical condensing system may further comprise a Galvano-mirror that is between the out-of-axis parabolic mirror and the second beam splitter and configured to cause the pump beam to scan the silicon wafer.

In an example embodiment, the delay mechanism may be configured to change the light path length of the trigger beam by switching optical fibers having different lengths with a light switch.

In an example embodiment, the photoconductive antenna may include a low temperature grown gallium arsenide as a material, the pulsed laser beam may have a wavelength of 1100 nm to 1550 nm, and a pulse width of 1 ps or less, and the controller may be configured to use, by the filtering, the frequency band from 100 GH or more to 10 THz or less.

According to an aspect of the present inventive concepts, a measuring apparatus may include a first beam splitter configured to split a pulsed laser beam into a pump beam and a trigger beam, an amplitude modulation element disposed on a light path of the pump beam, a third beam splitter configured to split the pump beam into a first pump beam and a second pump beam, a first optical illumination system configured to illuminate a specimen from a first surface with the first pump beam to condense the first pump beam on a measurement portion of the specimen, a second optical illumination system configured to illuminate the specimen from a second surface opposite to the first surface with the second pump beam to condense the second pump beam on the measurement portion of the specimen, an optical condensing system configured to condense an electromagnetic wave radiated from the specimen illuminated with the first pump beam and the second pump beam, a delay mechanism configured to change a light path length of the trigger beam, a time domain detector configured to detect the electromagnetic wave condensed by the optical condensing system, for each time when the trigger beam, the light path length of which has been changed in the delay mechanism is incident, and a controller configured to lock-in detect the electromagnetic wave detected by the time domain detector with a driving frequency of the amplitude modulation element. A light path length of the first pump beam in the first optical illumination system may be identical to a light path length of the second pump beam in the second optical illumination system. The controller may be configured to perform Fourier transform on a time domain waveform of the detected electromagnetic wave to obtain a frequency domain waveform, and obtain a magnitude and a direction of an electric field of the measurement portion by filtering a frequency band from the obtained frequency domain waveform.

According to an aspect of the present inventive concepts, a testing apparatus may include the measuring apparatus described above, and the testing apparatus may be configured to test an electrical contact of the specimen based on the magnitude and direction of the electric field obtained by the measuring apparatus.

According to an aspect of the present inventive concepts, a testing apparatus may include the measuring apparatus described above, and the testing apparatus is configured to test at least one of an existence ratio of doping materials contained in the specimen, a thickness of a depletion layer, an internal deformation or an activity after annealing based on the magnitude and direction of the electric field obtained by the measuring apparatus.

A measuring apparatus and a testing apparatus having the same according to some examples of the present inventive concepts can improve precision in measuring a magnitude and a direction of an electric field.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
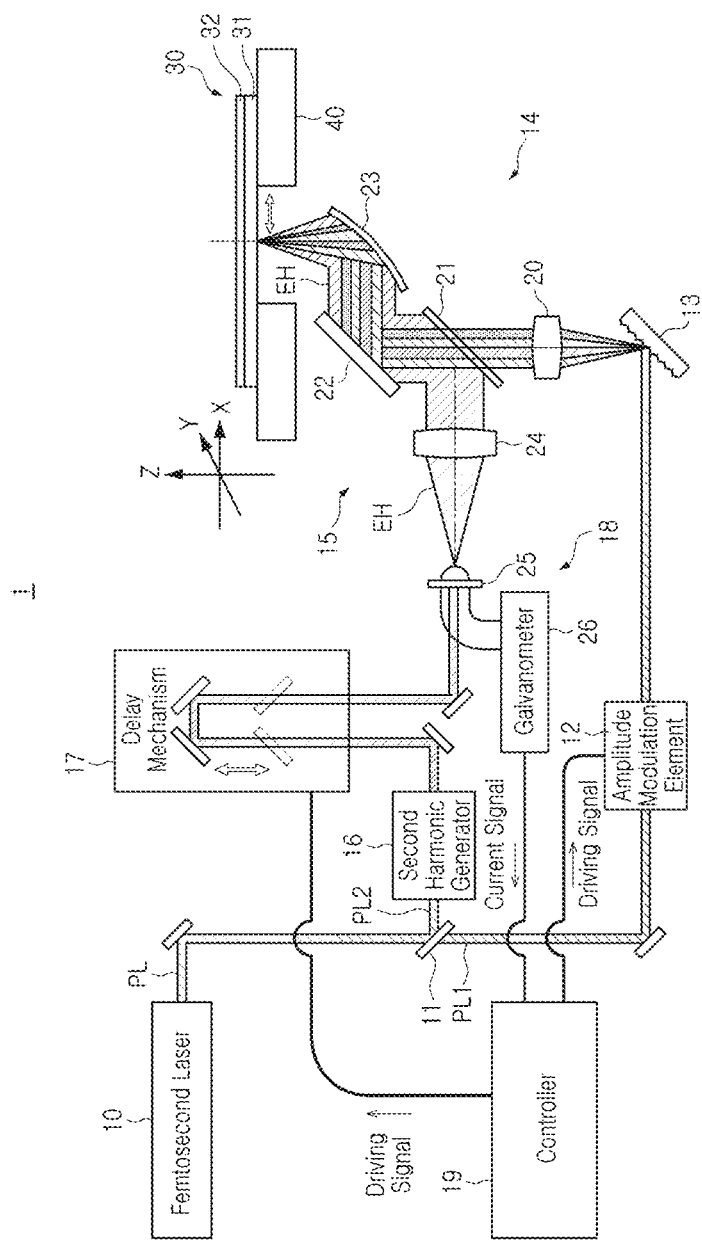
FIG. 1 is a configuration diagram illustrating a measuring apparatus, according to an example embodiment.

Hereinafter, some example embodiments of the present inventive concepts will be clearly described in detail with reference to the accompanying drawings.

While the term "same," "equal" or "identical" is used or numerical value is recited or a numerical value is merely recited in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Some example embodiments of the present inventive concepts relate to semiconductor apparatuses including a semiconductor device, wherein a pulsed laser is irradiated to the semiconductor apparatus, and an electromagnetic wave radiated by photocarriers such as excited electrons is measured, in order to evaluate an electric field inside the semiconductor apparatus.

Until about 20 years ago, miniaturization of a circuit pattern was the only evolutionary axis in the field of manufacturing a semiconductor apparatus, and in addition to an enhancement in a driving speed or a reduction of power consumption, a cost reduction could be simultaneously implemented with the miniaturization. However, the technical difficulty of miniaturization has increased, and in addition to three-dimensionally structuring a semiconductor device, a contribution to an enhancement in performance by controlling physical properties, such as an enhancement of electron mobility due to an introduction of new materials such as High-K, Low-K, etc., and an intentional addition of strain has been particularly increasing. Due to these factors, a measurement of physical properties with high-precision and high-throughput has been indispensable in both a process construction in research and development, and a yield enhancement in mass production. For example, it is desired to measure an amount or spatial distribution of dopants in an ion injection process, a reactivation state after annealing, an amount of internal strain in a selective epitaxial growing process of SiGe, etc. However, these measurement uses a physical measuring apparatus such as an Optical Critical Dimension (OCD) or Critical Dimension-Scanning Electron Microscope (CD-SEM), etc., or uses a chemical measurement method by means of using fluorescent X-rays, mass spectrometry, etc. These measurement methods are accurate, but difficult to deal with in terms of throughput, and therefore, destructive inspections are often conducted.

On the other hand, as another approach, an electrical property test includes a transistor inspection of MOS (Metal Oxide Silicon) structure which is a basic component. Such a transistor inspection evaluates CV properties, etc. by electrically connecting a probe. Such an inspection method directly evaluates a performance of a semiconductor device. LADA (Laser-assisted device alteration), OBERCH(Optical Beam Induced Resistance Change), etc. may identify a failure and specify a margin to the failure or a location in a high-resistance device, by receiving light.

However, because all the above-mentioned inspections are contact-type inspections, the inspections can be performed only in semiconductor post-processes in which wiring layers or pads have been formed. Methods that can perform an evaluation of electrical properties in semiconductor front-end process without contact are desired to accurately interpret, for example, a spread of a depletion or an inversion region formed inside a semiconductor device from the results of the electrical property evaluation. Therefore, a feedback can be rapidly provided to a process such as an ion injection and/or annealing. Accordingly, it would be very effective in shortening a development period or a manufacturing cycle time, but there is no established measurement technology satisfying such needs.

In order to satisfy such needs, a Laser-induced Terahertz Emission Microscope (LTEM) technology was introduced. In the LTEM technology, an electromagnetic wave including a terahertz band (for example, a frequency band of 100 GHz to 10 THz) is generated by irradiating a pulsed laser to a material of a semiconductor in presence of an electric field. An electromagnetic wave in a terahertz band is referred as 'a terahertz wave.' As shown in Formula 1 below, a terahertz wave $E_{THz}$ induced by a change in current is proportional to a change $\Delta n$ of the number of the photocarriers, and a change $\Delta v$ in a moving velocity of the photocarriers, and inversely proportional to a time width $\Delta t$ of the pulsed laser:

$$E_{THz} \propto \frac{\partial J}{\partial t} \propto \frac{\Delta n \Delta v}{\Delta t} \propto \mu E_B I_p \qquad \text{[Formula 1]}$$

By applying this formula, a pulsed laser beam of an ultrashort pulse with a femtosecond scale is scanned over a semiconductor apparatus which is a measurement target. The photocarriers including electrons and holes generated by photo excitation are accelerated in an electric field inside the semiconductor apparatus so as to generate an electromagnetic wave. By detecting the generated electromagnetic wave, a distribution of the electric field inside the measurement target can be calculated by an analysis. As such, the LTEM is an innovative technology capable of measuring an electric field inside a measurement target. Examples of applying the LTEM include a measurement of acceleration of photocarriers by an electric field generated in vicinity of a p-n junction in a transistor. The LTEM has already been commercialized for a solar cell inspection.

A problem of the LTEM is that a radiated terahertz wave has week strength and low sensitivity. In order to improve the sensitivity, an external bias voltage may be applied, or an additional terahertz wave may be irradiated to strengthen an inner electric field.

Figure 15:
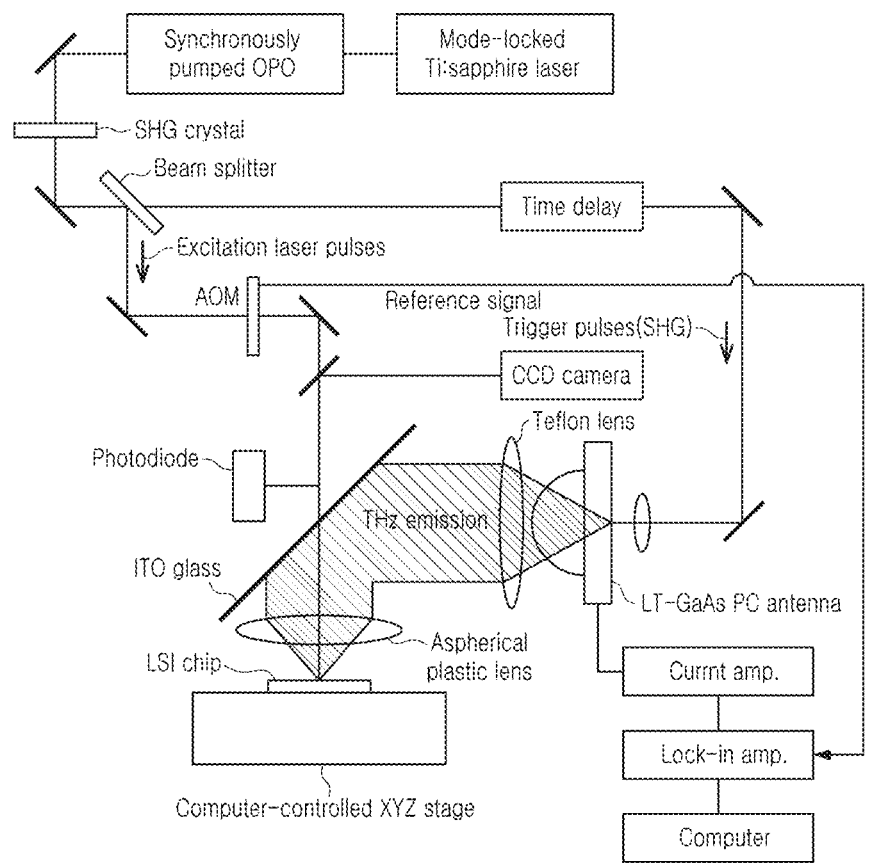
FIG. 15 is a configuration diagram illustrating a Laser-induced Terahertz Emission Microscope (LTEM)
Figure 16:
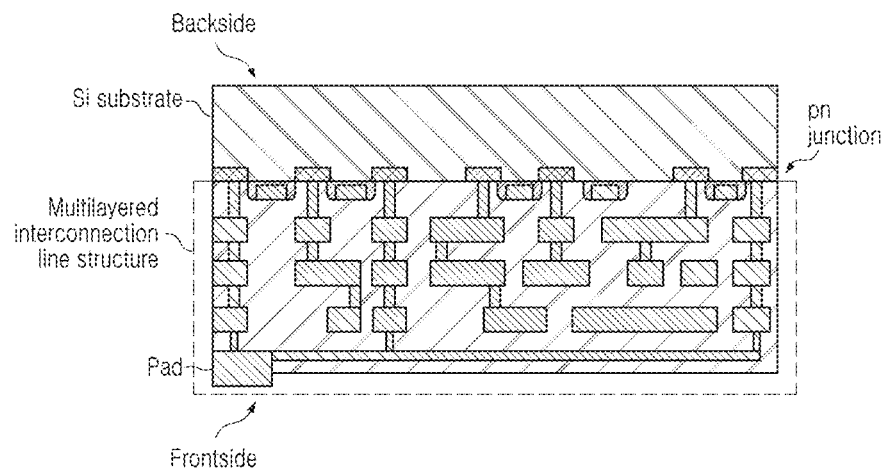
FIG. 16 is a cross-sectional view illustrating a semiconductor device in which a terahertz wave is measured by an LTEM.
Figure 17:
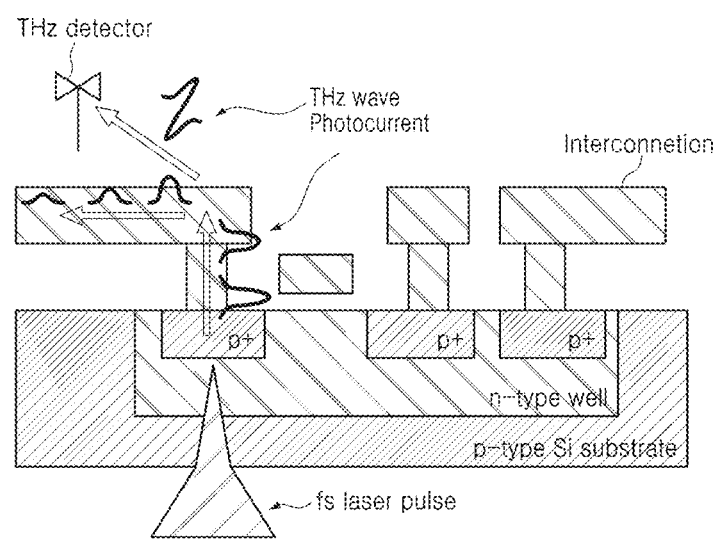
FIG. 17 is a diagram illustrating that a terahertz wave is radiated when a semiconductor device is irradiated with an ultrashort pulse.
Figure 18:
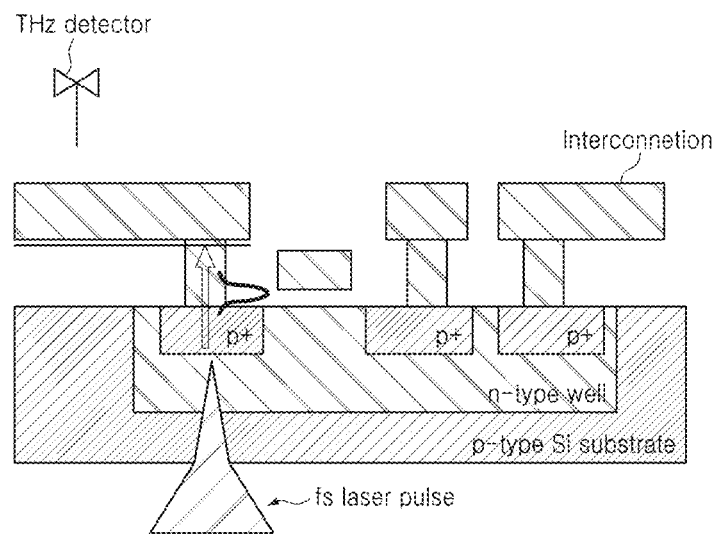
FIG. 18 is a diagram illustrating that a terahertz wave is radiated when a semiconductor device is irradiated with an ultrashort pulse.

FIG. 15 is a configuration diagram illustrating an LTEM. FIG. 16 is a cross-sectional view illustrating a semiconductor apparatus in which a terahertz wave is measured by an LTEM. FIG. 17 and FIG. 18 are diagrams illustrating that a terahertz wave is radiated when a semiconductor device is irradiated with an ultrashort pulse. A relationship between a structure of a semiconductor apparatus, which is a measurement target, and a radiated terahertz wave is being studied. A wire electrically connected to a p-n junction serves as an antenna, and it can be seen that strength of a terahertz wave increases. In the meantime, applying an external bias at the time of inspection means that the advantage of a contactless measurement is lost.

Furthermore, it is practically difficult to add a wire in order to inspect a semiconductor apparatus which is a measurement target. Thus, increasing a detection sensitivity is not a fundamental solution. In addition, an optical configuration without wasting a terahertz wave generated by the optical configuration using optical members has been proposed. However, this approach merely increases the amount of detected light two or three time, and thus are not appropriate for greatly enhancing the sensitivity Moreover, when a measurement and an inspection are carried out in a manufacturing site of a semiconductor apparatus, it may be desired to make a measurement in a process after forming a transistor and a metal wiring layer on a front surface of a semiconductor wafer. In some instances, it may be desired to cause a pulsed laser beam from a rear surface of the semiconductor wafer, and detect a terahertz wave from the rear surface similar thereto. In order to cause the pulsed laser beam to reach the transistor, it may be desired that the pulsed laser beam has a wavelength of 1000 nm or more transmitting through the semiconductor wafer of silicon as well as the other layers. However, the number of generated photocarrier reduces as the pulsed laser absorbed by the transistor is not much at this wavelength, and therefore, the strength of the radiated terahertz wave is lowered.

Figure 19:
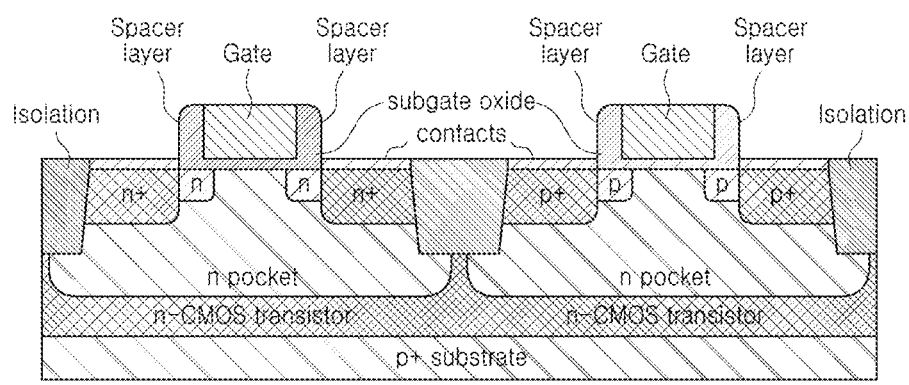
FIG. 19 is a cross-sectional view illustrating a structure of a transistor.

In addition, photocarriers are generated in a path of a pulsed laser beam reaching a transiter by absorbing the pulsed laser beam. For example, considering a transistor having a structure shown in FIG. 19, a terahertz wave may be generated by an acceleration by an electric field at a material interface other than a measurement target, or by a diffusion electric field by a Photo-Dember effect. Such a terahertz wave causes a suppression of the measurement. FIG. 19 is a cross-sectional view illustrating a structure of a transistor of a semiconductor apparatus. As shown in FIG. 19, typically, a source and a drain in vicinity of a gate are the measurement targets. However, an electric field is generated in vicinity of other boundary due to a change in potential. Furthermore, a terahertz wave is generated by an acceleration of photocarriers.

Figure 20:
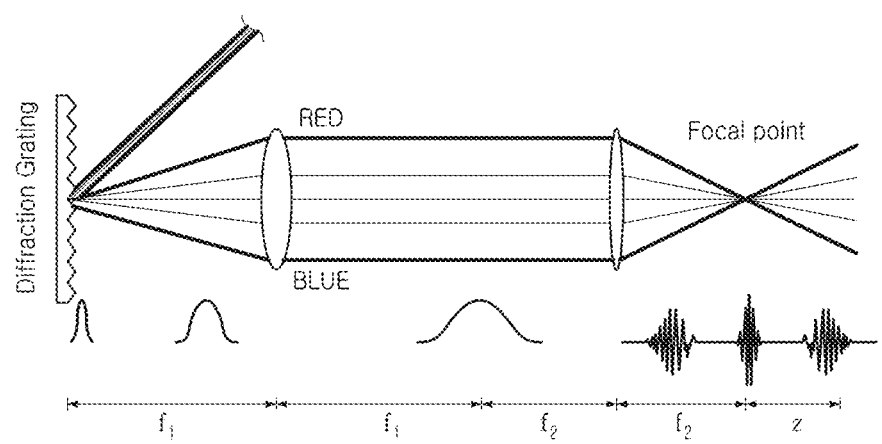
FIG. 20 is a diagram illustrating a temporal focusing.

It may be desired to measure only a terahertz light generated in vicinity of a measurement target in order to realize a measurement and an inspection by applying an LTEM technology in a semiconductor manufacturing process. As a measurement method with a high spatial resolution, a novel measurement method applying a temporal focusing to an LTEM has been proposed. The temporal focusing is a method of illuminating a pulsed laser used in a biological observation. FIG. 20 is a descriptive diagram illustrating a temporal focusing. As shown in FIG. 20, an optical system divides an ultrashort pulse into a plurality of beams by wavelength with a diffraction grating, and the divided beams are condensed on one point again. As a result, a pulse width (a pulse duration) in vicinity of the focus is shortened. In the meantime, a pulse width in a region away from the focus is lengthened. It is an illumination technology for multiphoton excitation microscopes, and may enhance a resolution in a depth direction with respect to the measurement target as shown in FIG. 20.

When illuminating with a temporal focusing in an LTEM, a beam becomes an ultrashort pulsed beam only in vicinity of a focus of an optical illumination system. Other than the focus, the light becomes a pulsed light longer than in vicinity of the focus. Accordingly, in an out-of-focus area, a laser is illuminated for a long time relative to the pulse width in vicinity of the focus. Therefore, a wavelength of an electromagnetic wave generated from photocarriers generated by absorbing the pulsed light in an area other than the focus is longer than a wavelength of an electromagnetic wave generated from photocarriers generated by absorbing the pulsed light in vicinity of the focus, wherein an LTEM may measure a change in an electric field in a time domain waveform. Therefore, a frequency domain waveform may be obtained by a Fourier transformation. Accordingly, an LTEM may extract information of an electromagnetic wave caused only by photocarriers in vicinity of a focus of an optical illumination system by filtering the frequency.

In turn, a measurement apparatus according to some example embodiments of the present inventive concepts will be described. A measurement apparatus according to some example embodiments of the present inventive concepts can rapidly measure an electric field in a semiconductor apparatus in a contactless manner. A measurement apparatus according to some example embodiments of the present inventive concepts can measure a magnitude and a direction of an electric field of a measurement portion of a specimen such as a semiconductor apparatus, wherein the semiconductor apparatus may comprise a semiconductor substrate and a semiconductor device formed on the semiconductor substrate. The semiconductor device may be formed on a front surface of the semiconductor apparatus. The semiconductor substrate may be disposed on a rear surface of the semiconductor apparatus. The measurement apparatus irradiates an infrared pulsed laser beam with high penetration power with respect to the semiconductor substrate from a rear surface of the semiconductor substrate. The pulsed laser beam focuses in vicinity of the semiconductor device on a surface of the semiconductor apparatus.

An optical illumination system transmits a pulsed laser beam of a wavelength different for each incident angle, in order to minimize a pulse width in a focal position. As a result, a pulsed laser beam is excited on the semiconductor substrate only in vicinity of the focus of the pulsed laser beam for a short period corresponding to the minimal pulse width, whereby photocarriers including electron and hole pairs may be formed. Furthermore, the photocarriers are accelerated by an electric field in the semiconductor apparatus applied thereto, and an electromagnetic wave induced by the accelerated photocarriers may be radiated.

The radiated electromagnetic wave may be detected by a photoconductive antenna triggered by a trigger beam, which is generated by splitting the pulsed laser beam by using a beam splitter. A time domain waveform of an electromagnetic wave detected by disposing a delay mechanism with respect to the trigger beam may be measured. A frequency domain waveform may be obtained by Fourier transforming the time domain waveform, and a frequency component corresponding to a minimum pulse width of the pulsed laser bean may be analyzed. Accordingly, an influence of an electromagnetic wave caused by the absorption of the pulsed laser beam outside the vicinity of the focus may be eliminated. In addition, an electromagnetic wave caused by the absorption of the pulsed laser beam outside the vicinity of the focus can be detected. As such, a measurement apparatus according to some example embodiments of the present inventive concepts can realize efficient and highly accurate measurement. Hereinafter, a measurement apparatus according to an example embodiment of the present inventive concepts will be described in detail, with reference to the figures.

FIG. 1 is a configuration diagram illustrating a measuring apparatus, according to an example embodiment. Referring to FIG. 1, the measuring apparatus may comprise a femtosecond laser 10, a first beam splitter 11, an amplitude modulation element 12, a diffraction grating 13, an optical illumination system 14, an optical condensing system 15, a second harmonic generator 16, a delay mechanism 17, a time domain detector 18 and a controller 19. The measuring apparatus 1 may be configured to measure a magnitude and a direction of an electric field inside a specimen 30. For example, the measuring apparatus 1 may measure a built-in electric field inside the specimen 30.

The femtosecond laser 10 is an example of a pulsed laser. The pulsed laser may generate a pulsed laser beam PL. When generating the pulsed laser beam PL, the pulsed laser is not limited to the femtosecond laser 10. The pulsed laser beam PL generated by the pulsed laser may have a wavelength of 800 nm to 1550 nm. In addition, the pulsed laser beam PL may have a wavelength of 1000 nm or more, or may have a wavelength of 1100 nm to 1550 nm. Furthermore, the pulsed laser beam may have a pulse width of 1 ps or less.

Figure 2:
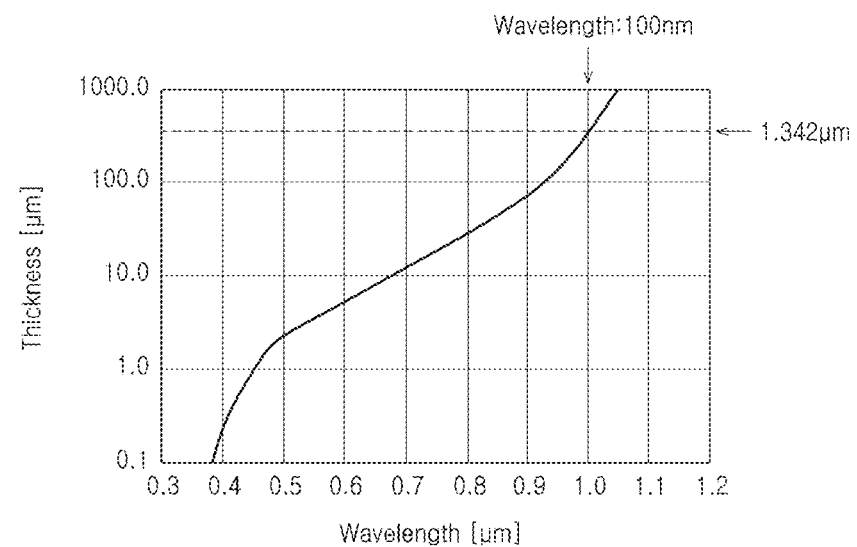
FIG. 2 is a graph illustrating a relationship between a wavelength transmitted into silicon and a thickness.

FIG. 2 is a graph illustrating a relationship between a wavelength transmitted into silicon and a thickness. Referring to FIG. 2, it shows a thickness at which a transmittance of light inside silicon has $1/e^2$. As shown in FIG. 2, when the specimen 30 contains silicon, the femtosecond laser 10 having a wavelength of 1000 nm or more may be used, in order to secure a transmittance of the pulsed laser beam PL with respect to silicon, The first beam splitter 11 may be configured to split the pulsed laser beam PL generated with the pulsed laser, such as the femtosecond laser 10, into a pump beam PL1 and a trigger beam PL2. For example, the first beam splitter 11 is a half mirror. The pump beam PL1 split by the first beam splitter 11 may enter the amplitude modulation element 12. The trigger beam PL2 split by the first beam splitter 11 may enter the second harmonic generator 16.

The amplitude modulation element 12 is disposed on a light path of the pump beam PL1. The amplitude modulation element 12 may be configured to be driven by a driving signal of the controller 19. The amplitude modulation element 12 may output a driving frequency when performing a lock-in detection by the controller 19. The amplitude modulation element 12 may modulate the pump beam PL1 for the lock-in detection. The pump beam PL1 may enter the diffraction grating 13 via the amplitude modulation element 12.

The diffraction grating 13 may be configured to disperse the pump beam PL1. For example, the diffraction grating 13 disperses the pump beam PL1 such that a diffraction direction varies with a wavelength contained in the pump beam PL1. In FIG. 1, in order to assist in understanding, the dispersed pump beam PL1 is indicated by four (4) bold lines with a different hatching style applied thereto, thereby showing that it is dispersed at four (4) wavelengths. The pump beam PL1 dispersed by the diffraction grating 13 may enter a collimator lens 20.

The optical illumination system 14 may be configured to illuminate the specimen 30 with the pump beam PL1 in order to cause the dispersed pump beam PL1 to be condensed on a measurement portion of the specimen 30. The optical illumination system 14 may comprise a collimator lens 20, a second beam splitter 21, a mirror 22 and an out-of-axial parabolic mirror 23. The optical illumination system 14 may further comprise additional optical member such as a mirror and a lens.

The collimator lens 20 is disposed such that one focus is located on the diffraction grating 13. The pump beam PL1 dispersed by the diffraction grating 13 enters the collimator lens 20. The collimator lens 20 may converts the pump beam PL1 dispersed by the diffraction grating 13 into parallel beams. The pump beam PL1 converted into the parallel beams may enter the second beam splitter 21.

The second beam splitter 21 may be configured to split the pump beam PL1 and an electromagnetic wave EH, which will be described below. For example, a surface of the second beam splitter 21 is coated with, for example, an Indium Tin Oxide (ITO) film. The second beam splitter 21 may allow the entered pump beam PL1 to be transmitted. The pump beam PL1 transmitted through the second beam splitter 21 may enter the mirror 22.

The mirror 22 may reflect the entered pump beam PL1. The pump beam PL1 reflected by the mirror 22 enters the out-of-axial parabolic mirror 23. The out-of-axial parabolic mirror 23 is an example of a condensing member. If the condensing member condenses the pump beam PL1 on the measurement portion of the specimen 30, the condensing member may be another optical member such as a lens. The out-of-axial parabolic mirror 23 is disposed between the second beam splitter 21 and the specimen 30. The out-of-axial parabolic mirror 23 is disposed such that the focus is located on the measurement portion of the specimen 30. The out-of-axial parabolic mirror 23 condenses the entered dispersed pump beam PL1 on the measurement portion of the specimen 30.

As such, in the optical illumination system, the pump beam PL1 dispersed by the diffraction grating 13 transmits through the collimator lens 20 to be parallel beams. The pump beam PL1 converted into the parallel beams transmits through the second beam splitter 21 and enters the mirror 22. The pump beam PL1 reflected on the mirror 22 is condensed on the measurement portion of the specimen 30 by the out-of-axial parabolic mirror 23. For example, the specimen 30 is mounted on a stage 40. The specimen 30 includes a substrate 31 and a semiconductor device 32 formed on the substrate 31.

Figure 3:
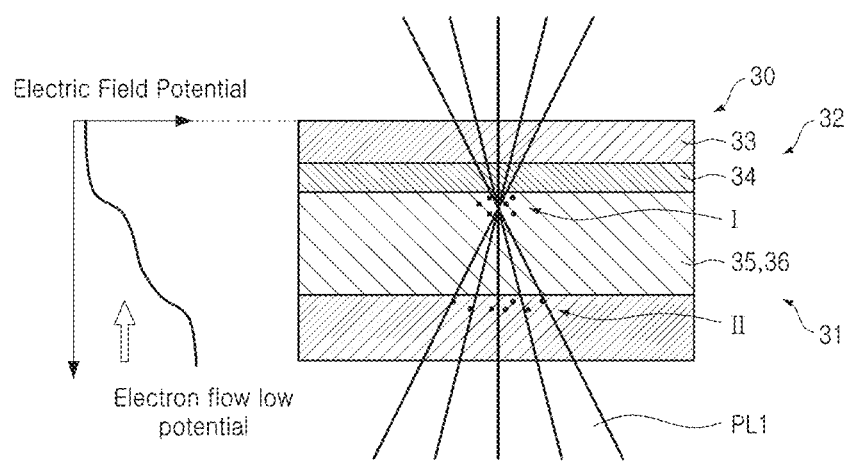
FIG. 3 is a cross-sectional view illustrating a specimen, according to an example embodiment.

FIG. 3 is a cross-sectional view illustrating a specimen 30, according to an example embodiment. FIG. 3 shows an electric field potential which can be positioned on each location of the specimen 30. As shown in FIG. 3, the specimen 30 includes a substrate 31 and a semiconductor device 32. Therefore, the specimen 30 may be a semiconductor apparatus. The substrate 31 includes a semiconductor. The semiconductor device 32 includes a gate metal 33 comprising a metal and an insulator 34 comprising an oxidized film. Therefore, the semiconductor apparatus has an MOS structure including the substrate 31, the insulator 34 and the gate metal 33.

Here, the measurement portion 36, for example, may comprise a depletion layer 35. In addition, as long as the measurement portion 36 is within the specimen 30, the measurement portion 36 is not limited to the depletion layer 35, and may be other portion within the specimen 30, such as the substrate 31 or an impurity layer. The specimen 30 may comprise a silicon wafer during a manufacturing process of the semiconductor apparatus. A structure of at least a portion of the semiconductor device 32 may be formed on a front surface of the silicon wafer. Depending on a manufacturing process of the semiconductor apparatus, there is a case in which the pump beam PL1 cannot reach the depletion layer (35) from the front surface due to a formation of a metal wiring layer on the gate metal 33.

Accordingly, the pump beam PL1 is condensed in vicinity of the depletion layer 35 by causing the pump beam PL1 to enter from (e.g., to be incident on) a rear surface of the substrate 31 of the specimen 30 mounted on the stage 40. Here, as shown in FIG. 2, the pump beam PL1 having a wavelength of 1000 nm or more generated by the femtosecond laser 10 may be entered, in order to secure a transmittance with respect to the specimen 30. In addition, the pump beam PL1 may be condensed by a temporal focusing. The pump beam PL1 may be absorbed in the specimen 30. At this time, photocarriers of electron and hole pairs may be formed. The photocarriers may be generated in Region I at a focal position of the pump beam PL1 and Region II at a non-focal position. Region I includes the measurement portion 36.

A built-in electric field is generated by a difference of the band structure of the respective layers within the specimen 30 including the substrate 31. Accordingly, an electric field potential is formed within the specimen 30. As a result, the photocarriers are accelerated toward a portion of which the electric field potential is low, and an induced electromagnetic wave EH may be radiated. The radiated electromagnet wave EH has a frequency reaching terahertz. Accordingly, the radiated electromagnet wave EH is referred to as a terahertz wave, and is also referred to as an electromagnetic wave $E_{Thz}$.

Figure 4:
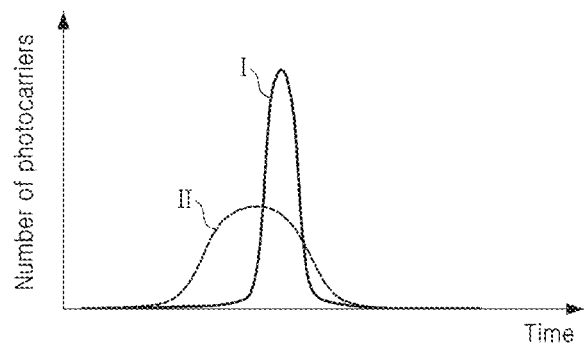
FIG. 4 is a graph illustrating photocarriers generated in Region I and Region II of a specimen, according to an example embodiment, wherein the horizontal axis indicates a time, and the vertical axis indicates the number of the generated photocarriers.

FIG. 4 is a graph illustrating photocarriers generated in Region I and Region II of a specimen 30, according to an example embodiment, wherein the horizontal axis indicates a time and the vertical axis indicates the number of the generated photocarriers. As shown in FIG. 4, when the specimen 30 is illuminated with the pump beam PL1 by a temporal focusing, in addition to the photocarriers generated in Region I at the focal position, the photocarriers may be also generated in Region II at the non-focal position. Because the pump beam PL1 is entered from (e.g., to be incident on) the rear surface, the photocarriers in Region II may be generated in advance to the photocarriers in Region I. Also in the temporal focusing, the number of photocarriers generated at the non-focal position does not reduce. However, in Region II at the non-focal position, since the photocarriers are generated over a long period, the wavelength of the induced electromagnetic wave EH may be lengthened, and the strength thereof may be lowered.

Figure 5:
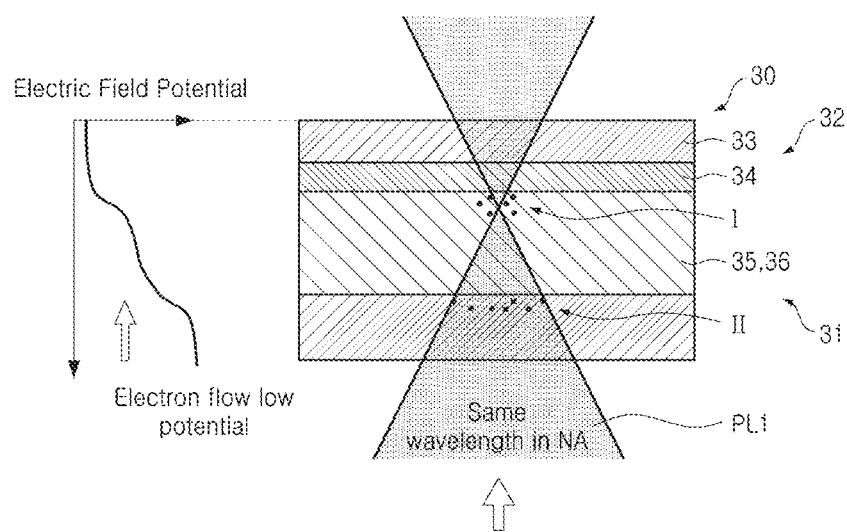
FIG. 5 is a cross-sectional view illustrating a specimen, according to a comparative example.
Figure 6:
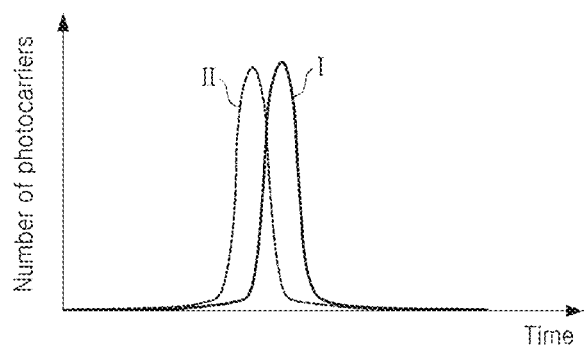
FIG. 6 is a graph illustrating photocarriers generated in Region I and Region II of a specimen, according to a comparative example, wherein the horizontal axis indicates a time, and the vertical axis indicates the number of the generated photocarriers.

FIG. 5 is a cross-sectional view illustrating a specimen 30, according to a comparative example. FIG. 6 is a graph illustrating photocarriers generated in Region I and Region II of a specimen 30, according to a comparative example, wherein the horizontal axis indicates a time and the vertical axis indicates the number of the generated photocarriers. As shown in FIGS. 5 and 6, these comparative examples are examples in which the pump beam PL1 is not illuminated with a temporal focusing. In this case, all of the beams in an NA of the pump beam PL1 are in the same wavelength region. In the comparative examples, Region II generates photocarrier over a spatially wide range. However, Region II has a narrow time width identical to a time width of Region I. In the comparative examples, because the time widths of Region I at the focal position and the Region II at the non-focal position are the same or substantially similar to each other, it is difficult to distinguish an electromagnetic wave EH from Region II from an electromagnetic wave EH from Region I. Therefore, it is difficult to measure a magnitude and a direction of an electric field of the measurement portion 36.

Meanwhile, referring to FIG. 1 again, the radiated electromagnetic wave EH may be emitted from the rear surface of the substrate 31. The emitted electromagnetic wave EH may enter the out-of-axial parabolic mirror 23 of the optical condensing system 15.

The optical condensing system 15 may be configured to condense the electromagnetic wave EH radiated from the specimen 30 illuminated with the pump beam PL1. The optical condensing system 15 may comprise the out-of-axial parabolic mirror 23, the mirror 22, the second beam splitter 21 and the condensing lens 24. Accordingly, the second beam splitter 21, the mirror 22 and the out-of-axial parabolic mirror 23 are used in both of the optical illumination system 14 and the optical condensing system 15. The optical condensing system 15 may comprise a further optical member such as a mirror and/or a lens.

The out-of-axial parabolic mirror 23 may be configured to convert the entered (e.g., received) electromagnetic wave EH into parallel beams. The electromagnetic wave EH converted into the parallel beams may enter the mirror 22. The mirror 22 may be configured to reflect the entered electromagnetic wave EH. The reflected electromagnetic wave EH may enter the second beam splitter 21. The second beam splitter 21 may be configured to split the pump beam PL1 and the electromagnetic wave EH. For example, the second beam splitter 21 may reflect the entered electromagnetic wave EH. The electromagnetic wave EH reflected on the second beam splitter 21 may enter the condensing lens 24.

The condensing lens 24 is disposed, such that a focus is located at the photoconductive antenna 25. The condensing lens 24 may be configured to condense the electromagnetic wave EH on a time domain detector 18. For example, the time domain detector 18 may comprise the photoconductive antenna 25. The electromagnetic wave EH radiated from the specimen 30 may be reflected on the out-of-axial parabolic mirror 23 to be parallel beams. The electromagnetic wave EH converted into the parallel beams may be reflected on the second beam splitter 21 and condensed on the photoconductive antenna 25.

The second harmonic generator 16 may be configured to allow the trigger beam PL2 split by the first beam splitter 11 to enter thereinto. The second harmonic generator 16 may change a wavelength of the trigger beam PL2. The trigger beam PL2 is transmitted into the second harmonic generator 16, in order to increase a detection sensitivity of the electromagnetic wave EH at the photoconductive antenna 25 by efficiently generating photocarriers at a low temperature gallium arsenide (LT-GaAs) generally used as the photoconductive antenna 25.

The delay mechanism 17 may be configured to change a light path length of the trigger beam PL2. Accordingly, the delay mechanism 17 may change an arriving time of the trigger beam PL2 to the photoconductive antenna 25. The delay mechanism 17 may comprise a plurality of mirrors. The delay mechanism 17 may change the light path length of the trigger beam PL2 by changing a distance between the mirrors. In addition, the delay mechanism 17 may change the light path length of the trigger beam PL2 by switching optical fibers having different lengths with a light switch.

The time domain detector 18 may be configured to detect the electromagnetic wave EH condensed by the optical condensing system 15, for each time when the trigger beam PL2, a light path length of which has been changed in the delay mechanism 17, is incident. The time domain detector 18 may include the photoconductive antenna 25 and the Galvanometer 26. The photoconductive antenna 25 may comprise a low temperature gallium arsenide as a material, as described above. The photoconductive antenna 25 may detect a magnitude and a direction of the electromagnetic wave EH at a timing on which the trigger beam PL2 is incident. The photoconductive antenna 25 may detect the magnitude and the direction of the electromagnetic wave EH multiple times, by changing the timing on which the trigger beam PL2 arrives, while driving the delay mechanism 17.

When a semiconductor device is formed on a front surface of the specimen 30, the optical illumination system 14 may cause the pump beam PL1 to enter from (e.g., to be incident on) a rear surface of a silicon wafer. The optical condensing system 15 may condense the electromagnetic wave EH radiated from the rear surface of the silicon wafer on the time domain detector 18. The time domain detector 18 may detect the electromagnetic wave EH radiated from the rear surface among the electromagnetic wave EH generated by causing the pump beam PL1 to enter from (e.g., to be incident on) the rear surface of the silicon wafer.

Figure 7:
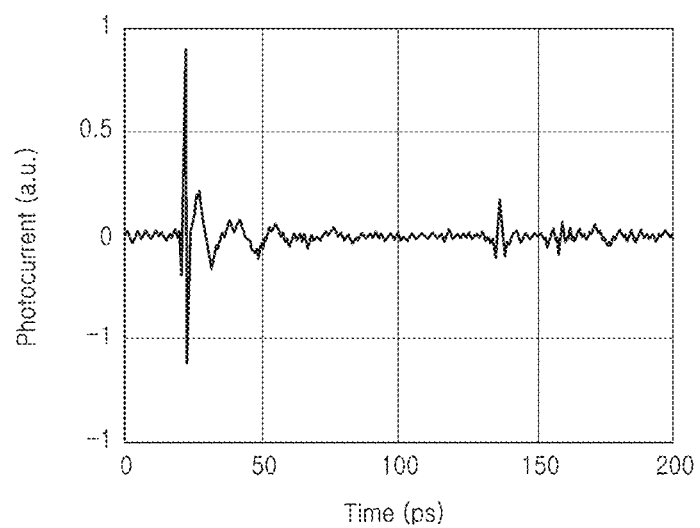
FIG. 7 is a graph illustrating a time domain waveform of an electromagnetic wave detected by a measuring apparatus, according to an example embodiment, wherein the horizontal axis indicates a time, and the vertical axis indicates a photo current.

FIG. 7 is a graph illustrating a time domain waveform of an electromagnetic wave detected by a measuring apparatus, according to an example embodiment, wherein the horizontal axis indicates a time, and the vertical axis indicates a photo current. As shown in FIG. 7, the time domain detector 18 detect the electromagnetic wave EH, for each incident time of the trigger beam PL2.

For example, the photoconductive antenna 25 generates photocarriers by the condensed electromagnetic wave EH. The Galvanometer 26 detects the generated photocarriers. In turn, the time domain detector 18 may detect a time domain waveform of the electromagnetic wave EH. The time domain waveform of the electromagnetic wave EH is referred to as a raw waveform of the electromagnetic wave EH.

The pump beam PL1 may be modulated by the amplitude modulation element 12. The controller 19 may be configured to lock-in detect the electromagnetic wave EH detected by the time domain detector 18 with a driving frequency of the amplitude modulation element 12. That is, the controller 19 may perform a lock-in detection in which only a modulation frequency in the amplitude modulation element 12 is extracted with a band pass filter from an output of the Galvanometer 26 in the time domain detector 18. Thereby, the controller 19 may detect an amplitude waveform of the electromagnetic wave EH with high accuracy from a weak signal.

Figure 8:
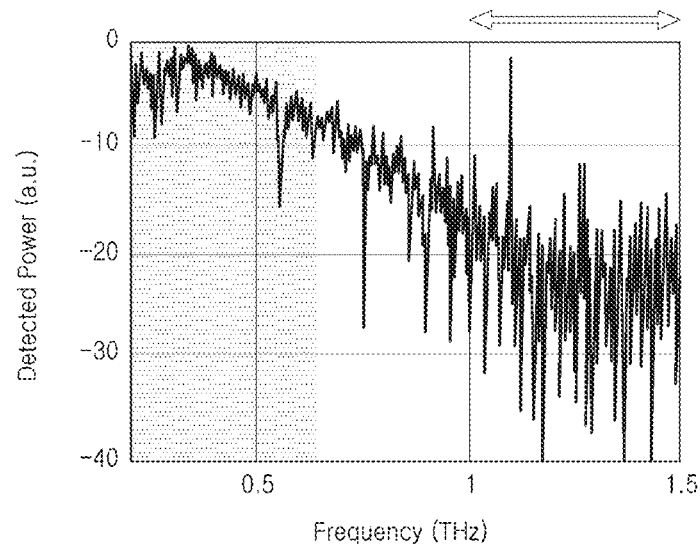
FIG. 8 is a graph illustrating a frequency domain waveform of an electromagnetic wave detected by a measuring apparatus, according to an example embodiment, wherein the horizontal axis indicates a frequency and the vertical axis indicates a detected power.

FIG. 8 is a graph illustrating a frequency domain waveform of an electromagnetic wave detected by a measuring apparatus, according to an example embodiment, wherein the horizontal axis indicates a frequency, and the vertical axis indicates a detected power. As shown in FIG. 8, the controller 19 may obtain a frequency domain waveform of an electromagnetic waver EH by Fourier transforming the time domain waveform of the electromatic wave EH.

Therefore, the controller 19 may obtain a magnitude and a direction of the measurement portion 36 of the specimen 30 by Fourier transforming the time domain waveform of the electromatic wave EH to obtain a frequency domain waveform, and filtering a predetermine frequency band from the obtained frequency domain waveform. Here, a high-pass filter or a band-pass filter may be applied in the filtering. The frequency to which the high-pass filter or the band-pass filter is applied is, for example, in a range of 100 GHz to 10 THz. That is, the controller 19 may use the mentioned frequency band of 100 GHz to 10 THz by the filtering. Here, the pump beam PL1 is temporally focused, as shown in FIG. 20. It has a short pulse width only in the vicinity of the focal position which is the measurement portion 36. Therefore, if a band-pass filter which mainly uses a high frequency side of the generated electromagnetic wave EH is applied, information only on the electromagnetic wave radiated from the measurement portion 36 may be obtained.

Figure 9:
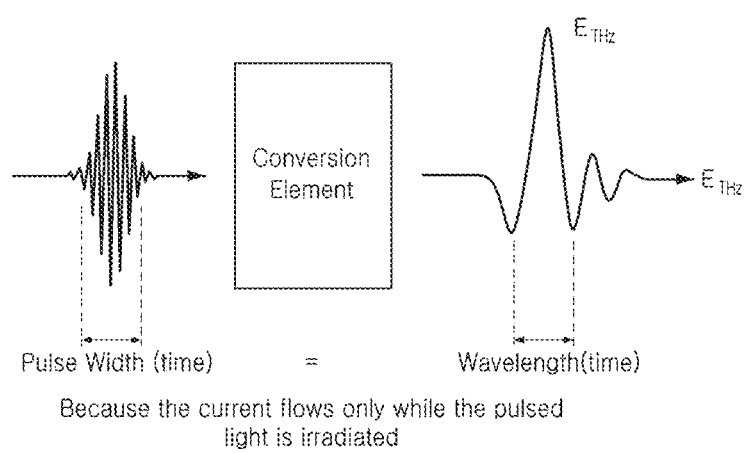
FIG. 9 is a diagram illustrating a relationship between a pulse width of a pump beam and a wavelength in a time domain of an electromagnetic wave radiated by being induced with the pump beam, according to an example embodiment.

FIG. 9 is a diagram illustrating a relationship between a pulse width of a pump beam PL1 and a wavelength in a time domain of an electromagnetic wave EH radiated by being induced by the pump beam PL1, according to an example embodiment. As shown in FIG. 9, the pulse width of the pump beam PL1 is the same as an upper limit of the frequency of the electromagnetic wave EH. The pulse width of the pump beam PL1 is almost the same as the wavelength of the electromagnetic wave EH. This is because a current flows only while the pulsed beam PL1 is irradiated.

In the frequency domain waveform of the detected electromagnetic wave EH, a cut-off frequency where a high-pass filter using only a high frequency side is applied may be set. Time domain wavelengths of the pump beam PL1 and the generated electromagnetic wave EH have the relationship shown in FIG. 9. Therefore, when the pulse width of the pump beam PL1 is indicated by $\Delta T_{pump}$, the upper limit of the frequency of the electromagnetic wave EH can be defined as $1/\Delta T_{pump}$. Accordingly, the cut-off frequency at the high frequency side may be set to $1/\Delta T_{pump}$. The cut-off frequency at the low frequency side may be set to an appropriate value considering a signal-to-noise ratio or a measuring time of the signal.

When a spatial distribution of the electromagnetic wave EH radiated from the specimen 30 is detected, as shown in FIG. 1, the electromagnetic wave EH may be measured while moving the specimen 30 in an X-axis direction and a Y-axis direction. In this case, a measurement may be made while narrowing down the delay mechanism 17 from one point where a time domain amplitude is large to a few points, in order to shorten the measurement time.

Next, some effects according to some example embodiments of the present inventive concepts will be described. The measuring apparatus 1 according to an example embodiment of the present inventive concepts may generate the photocarriers within a short time only with the measurement portion 36 of the specimen 30 on which the pump beam PL1 is dispersed by the diffraction grating 13 by means of the temporal focusing. Therefore, by combining a frequency analysis of the detected electromagnetic wave EH, the measuring apparatus 1 may obtain a magnitude and a direction of an electric field of the measurement portion 36 of the specimen 30 only. As a result, the measurement apparatus 1 may enhance a resolution in a depth direction of the specimen 30, and reduce a mixing of the electromagnetic wave EH from portions other than the measurement portion 36 of the specimen 30. Accordingly, the measurement apparatus 1 may improve the measurement accuracy and shorten the measurement time.

In addition, because a pulse width of a portion other than the measurement portion 36 of the specimen 30 becomes longer, the measuring apparatus 1 according to some example embodiments of the present inventive concepts may reduce damages of the specimen 30 due to the pulsed laser beam PL. Furthermore, the measurement apparatus 1 may enhance a resolution in a depth direction at a small NA, and may reduce an effect due to multiple reflections.

Figure 10:
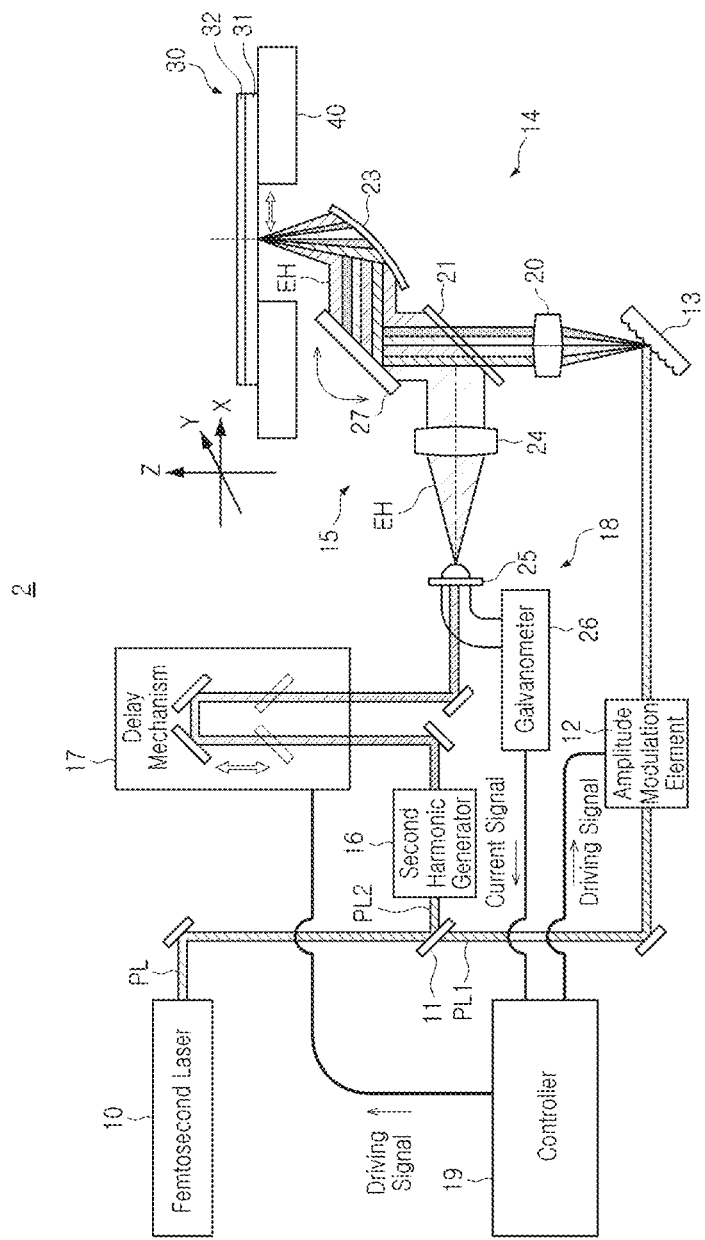
FIG. 10 is a configuration diagram illustrating a measuring apparatus, according to another example embodiment.

Next, a measuring apparatus according to another example embodiment of the present inventive concepts will be described. FIG. 10 is a configuration diagram illustrating a measuring apparatus, according to another example embodiment. Referring to FIG. 10, the measuring apparatus 2 according to another example of the present inventive concept include a Galvano-mirror 27 instead of the mirror 22 of the measuring apparatus 1 shown in FIG. 1. That is, the optical illumination system 14 and the optical condensing system 15 further include the Galvano-mirror 27 disposed between the out-of-axis parabolic mirror 23 and the second beam splitter 21. The Galvano-mirror 27 may scan the pump beam PL1 over the specimen 30.

The measuring apparatus 2 may also scan the pump beam PL1 over the specimen 30 in a state that the stage on which the specimen 30 is mounted is fixed. Therefore, the measuring apparatus 2 may measure a distribution of the electromagnetic wave EH radiated from the specimen 30 in the X-axis direction and the Y-axis direction. Other configurations and effect according to the present example embodiment of the present inventive concepts are included in the description of the previous example.

Next, a measuring apparatus according to a still another example embodiment of the present inventive concepts will be described. The measuring apparatus according to the still another example embodiment of the present inventive concepts may cause a two-photon absorption on the specimen 30. When the pulsed laser beam PL generated from the femtosecond laser 10 has a wavelength of 1100 nm or more, the pulsed laser beam PL is typically not absorbed in silicon. However, due to a tertiary nonlinear phenomenon called a two-photon absorption, there is a case in which the pulsed laser beam PL is absorbed in silicon. A probability of a two-phonon absorption is proportional to a square of the strength of the pulsed laser beam PL. Therefore, a two-photon absorption occurs only in the vicinity of the focus of the pulsed laser beam PL having increased strength. Accordingly, photocarriers due to a two-photon absorption are generated in the vicinity of the focus of the pulsed laser beam PL. The probability of generating photocarriers due to a two-photon absorption other in portions than the measurement portion 36 is very low.

Figure 11:
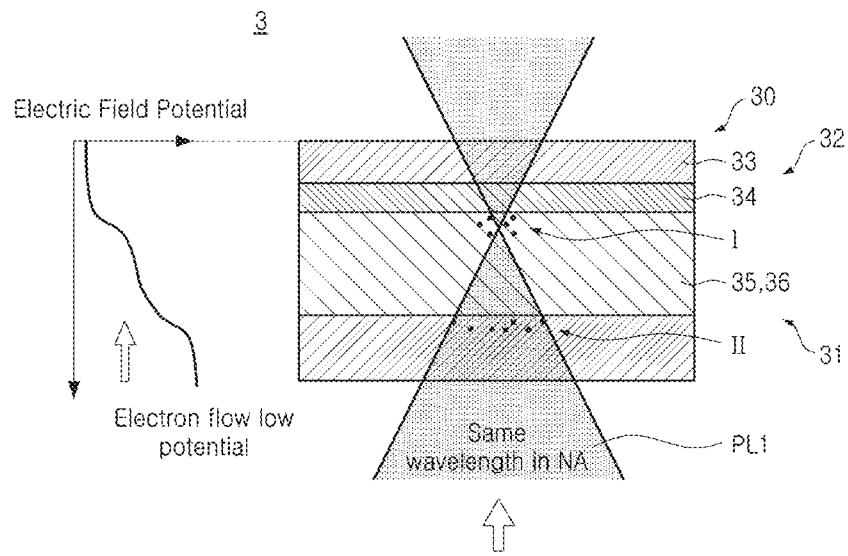
FIG. 11 is a cross-sectional view illustrating a specimen, according to still another example embodiment.
Figure 12:
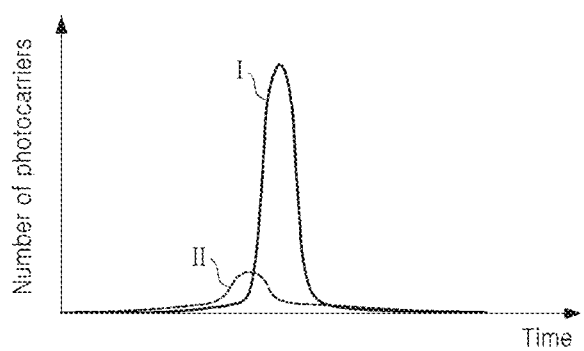
FIG. 12 is a graph illustrating photocarriers generated in Region I and Region II of a specimen, according to the second example embodiment, wherein the horizontal axis indicates a time, and the vertical axis indicates the number of the generated photocarriers.

FIG. 11 is a cross-sectional view illustrating a specimen 30, according to the still another example embodiment. FIG. 12 is a graph illustrating photocarriers generated in Region I and Region II of a specimen, according to the still another example embodiment, wherein the horizontal axis indicates a time and the vertical axis indicates the number of generated photocarriers. As shown in FIGS. 11 and 12, a temporal change in the number of photocarriers in Region I is very large, while a temporal change in the number of photocarriers in a region other than Region I is very small. In addition, because the pump beam PL1 has a wavelength of 1100 nm or more, the pump beam PL1 is not absorbed in silicon. Therefore, there is an advantage that the strength of the pump beam PL1 reaching the measurement portion 36 is very high.

A two-photon absorption also occurs even without being condensed with a temporal focusing. Therefore, a measuring apparatus according to the still another example embodiment may not include a diffraction grating 13. That is, the measurement apparatus may comprise a first beam splitter 11, an amplitude modulation element 12, an optical illumination system 14, an optical condensing system 15, a delay mechanism 17, a time domain detector 18 and a controller 19. The measuring apparatus according to the still another example embodiment may further comprise an optical member such as a mirror and/or a lens. Here, the pulsed laser beam PL and the pump beam PL1 may have a wavelength of 1100 nm or more.

The optical illumination system 14 may comprise a collimator lens 20, a second beam splitter 21 and an out-of-axial parabolic mirror 23. The out-of-axial parabolic mirror 23 condenses the pump beam PL1 on a measurement portion 36. The optical condensing system 15 may comprise the out-of-axial parabolic mirror 23, the second beam splitter 21 and a condensing lens 24. The optical condensing system 15 may condense an electromagnetic wave EH from a silicon wafer illuminated by the pump beam P1 through a two-photon absorption. In the present example, the pump beam PL1 may transmit through the collimator lens 20 to be parallel beams. The pump beam PL1 converted into the parallel beams may transmit through the second beam splitter 21 and be condensed on the measurement portion 36 by the out-of-axial parabolic mirror 23. The electromagnetic wave EH radiated from the silicon wafer may be reflected on the out-of-axial parabolic mirror 23 to be parallel beams. The electromagnetic wave EH converted into the parallel beams may reflected on the second beam splitter 21 and be condensed on a photoconductive antenna 25 by the condensing lens 24.

Figure 13:
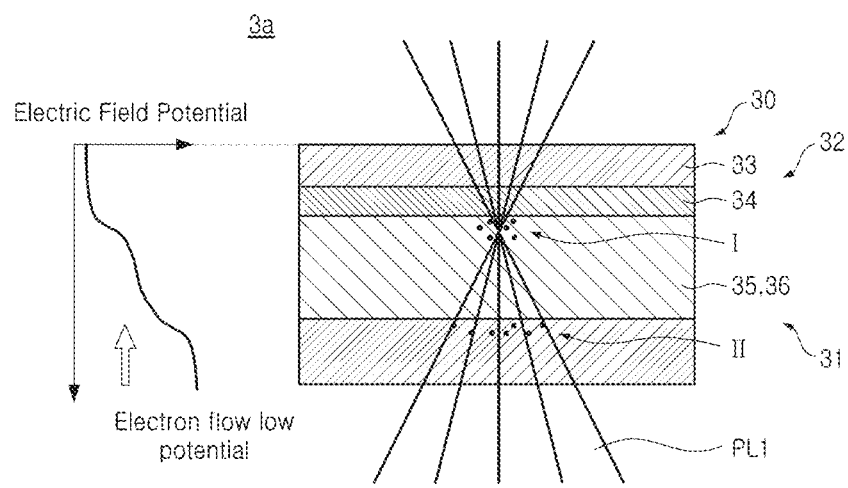
FIG. 13 is a graph illustrating photocarriers generated in Region I and Region II of a specimen, according to the second example embodiment, wherein the horizontal axis indicates a time, and the vertical axis indicates the number of the generated photocarriers.
Figure 14:
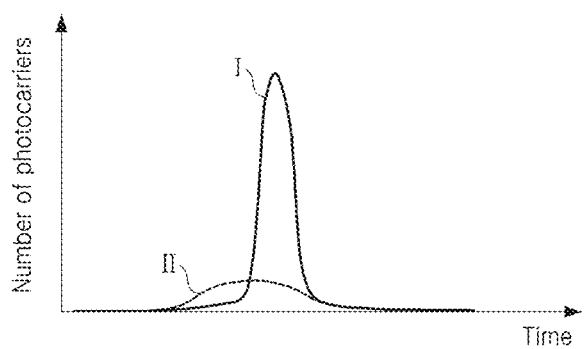
FIG. 14 is a diagram illustrating am absorption process of a pump beam by a two-photon absorption in a measuring apparatus according to the second example embodiment.

FIG. 13 is a cross-sectional view illustrating a specimen 30, according to the still another example embodiment. FIG. 14 is a graph illustrating photocarriers generated in Region I and Region II of a specimen, according to the still another example embodiment, wherein the horizontal axis indicates a time and the vertical axis indicates the number of generated photocarriers. As shown in FIGS. 13 and 14, a two-photon absorption may occur on the pump beam PL1 condensed by a temporal focusing. As described above, a two-photon absorption may occur even without a temporal focusing, but it is possible to measure an electromagnetic wave EH with a narrower region by combining it with a temporal focusing. Therefore, a measuring accuracy and a resolution may be enhanced.

According to some example embodiments of the present inventive concepts, the electromagnetic wave EH generated from the specimen 30, on which the pump beam PL1 enters, results from the photocarriers generated with a two-photon absorption of the pump beam PL1. With a two-photon absorption, because photocarriers of electron and hole pairs are generated only in the vicinity of the focus, both of a high transmittance up to the measurement portion 36 and a generation of a number of photocarriers are achieved. In addition, in a front-end state prior to forming a semiconductor device 32 on a substrate 31, the pump beam PL1 may enter from (e.g., to be incident on) a first surface and a second surface of the substrate 31. As a result, the strength of the pump beam PL1 may increase only at the measurement portion 36. For example, the first surface of the substrate 31 is a front surface of the substrate 31 and the second surface of the substrate 31 is a rear surface of the substrate 31.

According to some example embodiments of the present inventive concepts, when the specimen 30 is in the front-end state, the measuring apparatus may be provided with a first beam splitter 11, an amplitude modulation element 12, a third beam splitter (not shown), a first optical illumination system, a second optical illumination system, an optical condensing system 15, a delay mechanism 17, a time domain detector 18 and a controller 19.

The third beam splitter may be configured to split the pump beam PL1 into a first pump beam and a second pump beam. The first optical illumination system may be configured to illuminate the specimen 30 from the first surface with the first pump beam, in order to condense the first pump beam on the measurement portion 36 of the specimen 30. The second optical illumination system may be configured to illuminate the specimen 30 from the second surface opposite to the first surface with the second pump beam, in order to condense the second pump beam on the measurement portion 36 of the specimen 30. The optical condensing system 15 may be configured to condense an electromagnetic wave EH radiated from the specimen 30 illuminated with the first pump beam and the second pump beam, wherein a light path length of the first pump beam in the first optical illumination system is identical to a light path length of the second pump beam in the second optical illumination system. The first beam splitter 11, the amplitude modulation element 12, the delay mechanism 17, the time domain detector 18 and the controller 19 are the same as those of the aforementioned measuring apparatuses 1 and 2.

Any functional blocks shown in the figures and described above (e.g., controller) may be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While some example embodiments have been shown and described above, the present inventive concepts are not limited thereto, and it will be apparent to those skilled in the art that modifications and variations could be made without departing from the scope of the present inventive concepts as defined by the appended claims. For example, each component of the measuring apparatus according to the disclosed example embodiments may be combined to each other. In addition, a testing apparatus including one of the measuring apparatuses, which tests an electrical contact of a specimen from obtained electric field information, is also within a technical spirit of the present inventive concepts. In addition, a testing apparatus including one of the disclosed measuring apparatuses, which tests at least one of an existence ratio of doping materials contained in the specimen, a thickness of a depletion layer, an internal deformation and an activity after annealing, is also within a technical spirit of the present inventive concepts.

What is claimed is:

1. A measuring apparatus, comprising:
    a first beam splitter configured to split a pulsed laser beam into a pump beam and a trigger beam;
    an amplitude modulation element on a light path of the pump beam;
    a diffraction grating configured to disperse the pump beam;
    an optical illumination system configured to illuminate a specimen to condense the dispersed pump beam on a measurement portion of the specimen;
    an optical condensing system configured to condense an electromagnetic wave radiated from the specimen illuminated by the pump beam;
    a delay mechanism configured to change a light path length of the trigger beam;
    a time domain detector configured to detect the electromagnetic wave condensed by the optical condensing system, for each time when the trigger beam, the light path length of which has been changed in the delay mechanism, is incident; and
    a controller configured to lock-in detect the electromagnetic wave detected by the time domain detector with a driving frequency of the amplitude modulation element,
    wherein the controller is configured to perform a Fourier transform on a time domain waveform of the detected electromagnetic wave to obtain a frequency domain waveform, and obtain a magnitude and a direction of an electric field of the measurement portion by filtering a frequency band from the obtained frequency domain waveform.

2. The measuring apparatus of claim 1, wherein the time domain detector comprises a photoconductive antenna,
    wherein the optical illumination system comprises,
        a collimator lens on which the pump beam dispersed by the diffraction grating is incident,
        a second beam splitter configured to split the pump beam and the electromagnetic wave, and
        an out-of-axial parabolic mirror between the second beam splitter and the specimen, and configured to condense the dispersed pump beam on the measurement portion,
    wherein the optical condensing system comprises,
        the out-of-axial parabolic mirror,
        the second beam splitter, and
        a condensing lens configured to condense the electromagnetic wave,
    wherein the diffraction grating is configured to disperse the pump beam, and the collimator lens is configured to transmit therethrough the pump beam dispersed by the diffraction grating to be converted into parallel beams,
    wherein the second beam splitter is configured to transmit therethrough the pump beam converted into the parallel beams through the collimator lens, and the out-of-axial parabolic mirror is configured to condense the pump beam from the second beam splitter on the measurement portion, and wherein the out-of-axial parabolic mirror is configured to reflect the electromagnetic wave radiated from the specimen to be parallel beams, and the second beam splitter is configured to reflect the electromagnetic wave converted into the parallel beams by the out-of-axial parabolic mirror to be condensed on the photoconductive antenna by the condensing lens.

3. The measuring apparatus of claim 2, wherein the optical illumination system and the optical condensing system further comprises a Galvano-mirror that is between the out-of-axis parabolic mirror and the second beam splitter, and configured to cause the pump beam to scan the specimen.

4. The measuring apparatus of claim 1, wherein the delay mechanism is configured to change the light path length of the trigger beam by switching optical fibers having different lengths with a light switch.

5. The measuring apparatus of claim 2, wherein
the photoconductive antenna comprises a low temperature gallium arsenide as a material,
the pulsed laser beam has a wavelength of 800 nm to 1550 nm, and a pulse width of 1 ps or less, and
the controller is configured to use the frequency band from 100 GH to 10 THz.

6. The measuring apparatus of claim 1, wherein
the specimen comprises a silicon wafer during a manufacturing process of a semiconductor apparatus, and
a structure of at least a portion of a semiconductor device is on a front surface of the silicon wafer.

7. The measuring apparatus of claim 1, further comprising:
a second harmonic generator configured to change a wavelength of the trigger beam, wherein the pulsed laser beam comprises a wavelength of 1000 nm or more,
wherein the optical illumination system is configured to cause the pump beam to be incident on a rear surface of the specimen, and
the optical condensing system is configured to condense the electromagnetic wave emitted from the rear surface of the specimen on the time domain detector.

8. The measuring apparatus of claim 1, wherein
a wavelength of the pulsed laser beam is 1000 nm or more, and
the electromagnetic wave generated from the specimen, on which the pump beam is incident, is caused by photocarriers generated by a two-photon absorption of the pump beam.

9. A measuring apparatus, comprising:
a first beam splitter configured to split a pulsed laser beam having a wavelength of 1100 nm or more into a pump beam and a trigger beam;
an amplitude modulation element on a light path of the pump beam;
an optical illumination system configured to illuminate a silicon wafer as a specimen to condense the pump beam on a measurement portion of the silicon wafer;
an optical condensing system configured to condense an electromagnetic wave radiated via a two-photon absorption from the silicon wafer illuminated by the pump beam;
a delay mechanism configured to change a light path length of the trigger beam;
a time domain detector configured to detect the electromagnetic wave condensed by the optical condensing system, for each time when the trigger beam, a light path length of which has been changed in the delay mechanism, is incident; and
a controller configured to lock-in detect the electromagnetic wave detected by the time domain detector with a driving frequency of the amplitude modulation element,
wherein the controller is configured to perform a Fourier transform on a time domain waveform of the detected electromagnetic wave to obtain a frequency domain waveform and obtain a magnitude and a direction of an electric field of the measurement portion by filtering a frequency band from the obtained frequency domain waveform.

10. The measuring apparatus of claim 9, wherein the time domain detector comprises a photoconductive antenna,
wherein the optical illumination system comprises,
a collimator lens,
a second beam splitter configured to split the pump beam and the electromagnetic wave, and
an out-of-axial parabolic mirror between the second beam splitter and the silicon wafer, and configured to condense the pump beam on the measurement portion, wherein the optical condensing system comprises,
the out-of-axial parabolic mirror,
the second beam splitter, and
a condensing lens configured to condense the electromagnetic wave,
wherein the collimator lens is configured to transmit therethrough the pump beam to be parallel beams,
wherein the second beam splitter is configured to transmit therethrough the pump beam converted into the parallel beams through the collimator lens, and the out-of-axial parabolic mirror is configured to condense the pump beam from the second beam splitter on the measurement portion, and
wherein the out-of-axial parabolic mirror is configured to reflect the electromagnetic wave radiated from the silicon wafer to be parallel beams, and the second beam splitter is configured to reflect the electromagnetic wave converted into the parallel beams the out-of-axial parabolic mirror to be condensed on the photoconductive antenna by the condensing lens.

11. The measuring apparatus of claim 10, wherein the optical illumination system and the optical condensing system further comprises a Galvano-mirror that is between the out-of-axis parabolic mirror and the second beam splitter and configured to cause the pump beam to scan the silicon wafer.

12. The measuring apparatus of claim 9, wherein the delay mechanism is configured to change the light path length of the trigger beam by switching optical fibers having different lengths with a light switch.

13. The measuring apparatus of claim 10, wherein
the photoconductive antenna comprises a low temperature gallium arsenide as a material,
the pulsed laser beam has a wavelength of 1100 nm to 1550 nm, and a pulse width of 1 ps or less, and
the controller is configured to use the frequency band from 100 GH or more to 10 THz or less.

14. A measuring apparatus, comprising:
a first beam splitter configured to split a pulsed laser beam into a pump beam and a trigger beam;
an amplitude modulation element on a light path of the pump beam;
a third beam splitter configured to split the pump beam into a first pump beam and a second pump beam;

a first optical illumination system configured to illuminate a specimen from a first surface with the first pump beam to condense the first pump beam on a measurement portion of the specimen;

a second optical illumination system configured to illuminate the specimen from a second surface opposite to the first surface with the second pump beam to condense the second pump beam on the measurement portion of the specimen;

an optical condensing system configured to condense an electromagnetic wave radiated from the specimen illuminated with the first pump beam and the second pump beam;

a delay mechanism configured to change a light path length of the trigger beam;

a time domain detector configured to detect the electromagnetic wave condensed by the optical condensing system, for each time when the trigger beam, the light path length of which has been changed in the delay mechanism, is incident; and a controller configured to lock-in detect the electromagnetic wave detected by the time domain detector with a driving frequency of the amplitude modulation element, wherein a light path length of the first pump beam in the first optical illumination system is identical to a light path length of the second pump beam in the second optical illumination system, and the controller is configured to perform a Fourier transform on a time domain waveform of the detected electromagnetic wave to obtain a frequency domain waveform and obtain a magnitude and a direction of an electric field of the measurement portion by filtering a frequency band from the obtained frequency domain waveform.

15. A testing apparatus comprising the measuring apparatus of claim 1, wherein the testing apparatus is configured to test an electrical contact of the specimen based on the magnitude and direction of the electric field obtained by the measuring apparatus.

16. A testing apparatus comprising the measuring apparatus of claim 1, wherein the testing apparatus is configured to test at least one of an existence ratio of doping materials contained in the specimen, a thickness of a depletion layer, an internal deformation or an activity after annealing based on the magnitude and direction of the electric field obtained by the measuring apparatus.

17. A testing apparatus comprising the measuring apparatus of claim 9, wherein the testing apparatus is configured to test an electrical contact of the silicon wafer based on the magnitude and direction of the electric field obtained by the measuring apparatus.

18. A testing apparatus comprising the measuring apparatus of claim 9, wherein the testing apparatus is configured to test at least one of an existence ratio of doping materials contained in the silicon wafer, a thickness of a depletion layer, an internal deformation or an activity after annealing based on the magnitude and direction of the electric field obtained by the measuring apparatus.

19. A testing apparatus comprising the measuring apparatus of claim 14, wherein the testing apparatus is configured to test an electrical contact of the specimen based on the magnitude and direction of the electric field obtained by the measuring apparatus.

20. A testing apparatus comprising the measuring apparatus of claim 14, wherein the testing apparatus is configured to test at least one of an existence ratio of doping materials contained in the specimen, a thickness of a depletion layer, an internal deformation or an activity after annealing based on the magnitude and direction of the electric field obtained by the measuring apparatus.

* * * * *